UNITED STATES PATENT OFFICE.

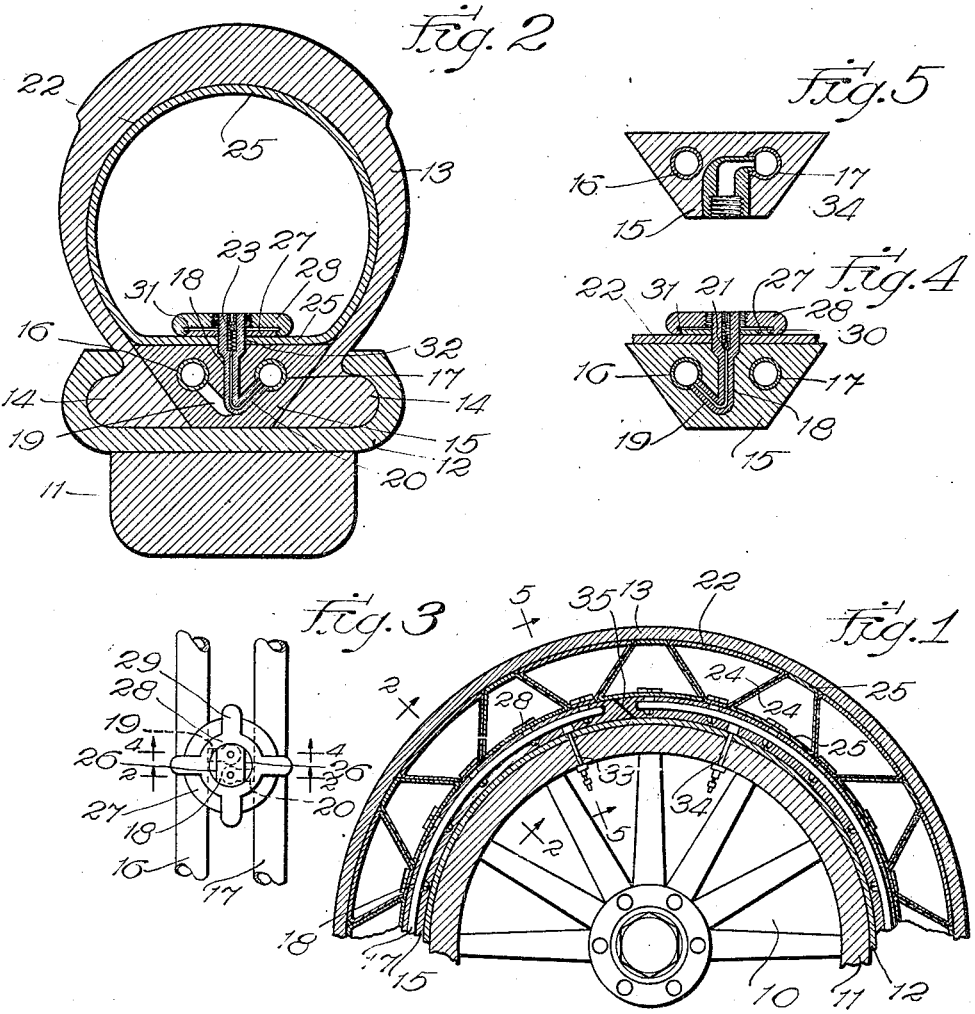

HARRY L. von TROTT, OF FORT MADISON, IOWA.

TIRE.

1,303,998.     Specification of Letters Patent.     Patented May 20, 1919.

Application filed July 26, 1918. Serial No. 246,796.

*To all whom it may concern:*

Be it known that I, HARRY L. von TROTT, a citizen of the United States, residing at Fort Madison, in the county of Lee and State of Iowa, have invented a certain new and useful Improvement in Tires, of which the following is a full, clear, concise, and exact description, reference being had to the accompanying drawings, forming a part of this specification.

This invention relates to tires for vehicles, and is especially concerned with pneumatic tires.

The objects of my invention are:

First: to provide a tire comprising an outer casing with means which will prevent the entire tire from becoming deflated and collapsing in the event of a local puncture or blow-out.

Second: to provide a tire in which the usual inner tube is omitted and its place taken and its function performed by a plurality of elastic cells which are provided with means for inflating and deflating the same;

Third: to provide novel means for inflating and deflating the cells and to prevent the remaining cells from becoming deflated in the event that one or several thereof are punctured or otherwise rendered incapable of retaining air under pressure;

Fourth: to provide a tire of novel construction with means whereby the air pressure in the tire can be measured while a tire is being inflated;

Fifth: to provide a tire having a sectional inner tube the cells of which are of novel construction; and Sixth: to provide novel means for securing the individual cells to a common supporting means.

Other objects will appear as the description progresses, reference being had to the accompanying drawings, in which:

Figure 1 is a section through the felly of a vehicle wheel and a tire secured thereto, the said tire embodying my invention, portions of the wheel being broken away;

Fig. 2 is a transverse sectional view taken on line 2—2 of Fig. 1. This figure discloses the valve mechanism shown in Fig. 3 and taken on line 2—2 thereof.

Fig. 3 discloses the inflating and deflating ducts and the coupling means for connecting these ducts with one of the elastic cells;

Fig. 4 is a section taken on line 4—4 of Fig. 3 with the exception that in this figure the valve strip is shown in section; and Fig. 5 is a transverse section through the valve strip taken on line 5—5 of Fig. 1, showing the means connecting either the inflating or deflating stem with either the inflating or deflating duct.

Similar characters of reference refer to similar parts throughout the several views.

Referring to the drawings, the reference character 10 indicates as a whole a vehicle wheel comprising a felly 11 to which is secured a rim 12, which is illustrated as being of a conventional type. The reference character 13 indicates the outer casing of a tire which at its adjacent edges is provided with the customary beads 14 for securing it to the rim 12. The reference character 15 indicates what for the purpose of convenience I will designate the valve strip. This valve strip may be made of any suitable rubber composition, but I prefer to make it of the trimmings which are a waste product formed during the manufacture of tire casings. These trimmings comprise fabric strips impregnated with rubber gum. By cutting up these strips into still finer strips, mixing them with a small quantity of rubber gum, passing them through a mill, and calendering the resulting mixture, a compound can be formed which will provide very suitable material for the manufacture of this valve strip. Embedded in this valve strip are two ducts 16 and 17 respectively, which may be suitably made of rubber tubing. At substantially equal distances along the valve strip I provide coupling members 18 which have a pair of bifurcations 19 and 20 at their inner ends. These bifurcations are provided with bores which continue upwardly through the members 18, the bore in the bifurcation 19 being provided with a valve 21 seating away from the elastic cell 22 with which its bore communicates, and the bore in the bifurcation 20 being provided with a valve 23 which seats toward the cell 22 with which its bore communicates.

The duct 16 will hereafter be referred to as the inflating duct and the duct 17 as the deflating duct. The cells 22 which perform the function of the inner tube in an ordinary tire are substantially triangular in longitudinal cross section, as shown in Fig. 1, and the contiguous side walls 24 thereof are thinner than the peripheral walls 25. Furthermore, these cells are so disposed in the casing that the apexes and bases of alternate cells contact with the outer face of the valve strip 15. By arranging the cells in this manner with the ends overlapping, the frictional contact of the ends of the cells common to structures heretofore proposed, in which the ends of adjacent cells extend substantially radially, is materially reduced. By making the side portions 24 of the cells of thinner material than the remaining portions thereof I provide cells which more easily expand to fill the spaces caused by the collapse of adjacent cells than in the structures heretofore proposed.

I will now describe somewhat more in detail the means which I employ for securing the cells to the valve strip. From an inspection of Fig. 3 it will be noted that the member 18 is flattened at each side as indicated at 26. A washer 27 provided with an aperture corresponding in shape to the upper end of the member 18 fits over this member and a nut 28 screws onto the upper end of the member 18. The nut 28 is provided with a plurality of radially extending arms 29 the ends of which curve downwardly and inwardly, as shown at 30 in Fig. 4 and are provided with beveled edges 31 which engage in a V-shaped groove in the periphery of the washer 27. In securing one of the cells to one of the coupling members the aperture in the cell at the point 32 is stretched sufficiently to allow the combined nut and washer to be inserted therein, and is then passed over the end of the member 18. Since the nut and washer are secured together it is not difficult to manipulate both of them to bring them in the proper relation to the end of the member 18, and by using the arms 29 the nut can be rotated to force the washer 27 into clamping relation with the adjacent portions of the cell. It is also a very easy matter, in case one of the cells becomes punctured, to remove this cell by simply unscrewing the nut 30, whereupon the cell can be removed and another substituted therefor.

For inflating the cells I provide an ordinary valve stem 33, which, as shown in Fig. 1, extends through the felly and is connected with the inflating duct 16 by means of a coupling member similar to that shown at 34 in Fig. 5. The coupling member 34 shown in Fig. 5 is used for connecting the deflating duct 17 with the deflating valve stem 34 shown in Fig. 1. These valve stems may be of the usual construction and need not be described in detail. As a matter of fact the stem 33 need not be provided with a valve, for the reason that the valves 21 in the members 18 will prevent the air from escaping from the cells through the inflating duct 16. I prefer, however, to provide a valve for the stem 33 for the reason that it insures that air will not escape from the tire even though the valves 21 may not function properly.

When inflating the tire constructed in accordance with my invention the source of compressed air will be attached to the stem 33. In order to determine when the tire is sufficiently inflated the cap of the stem 34 may be removed therefrom and a pressure gage of well-known construction secured to the stem 34, and inasmuch as this stem communicates directly with the cells through the deflating duct 17, it will accurately indicate the pressure in the cells so that it is unnecessary to disconnect the source of pressure from the tire to permit the pressure therein to be measured, and there is no danger of overinflating the tire.

As shown in Fig. 1 the ends of the valve strip 15 overlap each other at the point 35.

While I have described the details of the preferred embodiment of my invention, it is to be understood that my invention is not limited thereto but is capable of other adaptations and modifications within the scope of the appended claims. In particular my invention is not limited to the use of cells of the shape described herein nor to the use of any particular valve mechanism either in the members 18 or in the stems 33 and 34.

Having thus described my invention, what I claim is:

1. A tire comprising a casing having adjacent edges adapted to be secured to a wheel, a flexible valve strip lying between said edges and provided with longitudinally extending inflating and deflating ducts, a plurality of elastic cells inclosed by said valve strip and casing, means for establishing communication between each of said cells and said ducts comprising a coupling member provided with a pair of bores one of which communicates with said inflating duct and the other of which communicates with said deflating duct, an inwardly opening valve in said first-named bore, an outwardly opening valve in said second bore, and an inflating and a deflating stem communicating with said inflating and deflating ducts respectively.

2. A tire comprising a casing, a flexible valve strip within said casing provided with inflating and deflating ducts, a plurality of elastic cells located in said casing, a plurality of members secured to said valve strip for establishing communication between said cells and said ducts, the said members being provided with bores extending between said cells and said inflating duct and being provided with other bores extending between said cells and said deflating duct, valves in said first-named bores seating away from said cells, valves in said second-named bores, seating toward said cells, and inflating and deflating stems communicating with said inflating and deflating ducts respectively.

3. A tire comprising a casing, a flexible valve strip within said casing, having an inflating and a deflating duct formed therein, the said valve strip being easily flexed to conform it to a wheel and bring its ends in juxtaposition, and the walls of said ducts being sufficiently strong to withstand the pressures imposed thereon, a plurality of elastic cells in said casing, and means for establishing communication between each of said cells and each of said ducts, the means for establishing communication between said cells and one of said ducts comprising valves seating toward said cells, and the means for establishing communication between said cells and the other of said ducts comprising valves seating away from said cells.

4. A tire comprising a casing, a flexible valve strip within said casing, having an inflating and a deflating duct formed therein, the said valve strip being easily flexed to conform it to a wheel and bring its ends in juxtaposition, and the walls of said ducts being sufficiently strong to withstand the pressures imposed thereon, a plurality of elastic cells in said casing, and means for establishing communication between each of said cells and each of said ducts.

5. A tire comprising a casing, a plurality of flexible cells in said casing, a duct for inflating said cells, a duct for deflating said cells, and means for establishing communication between said ducts and said cells, comprising a single member for each of said cells having two ducts formed therethrough, one for establishing communication between each of said cells and said inflating duct, and one for establishing communication between each of said cells and said deflating duct, and means for securing said cells to said member, comprising a screw-threaded connection.

6. A tire comprising a casing, a plurality of flexible cells in said casing, a duct for inflating said cells, a duct for deflating said cells, and means for establishing communication between said ducts and said cells, comprising a single member for each of said cells having two ducts formed therethrough, one for establishing communication between each of said cells and said inflating duct, and one for establishing communication between each of said cells and said deflating duct.

7. A tire comprising a casing, a plurality of inflatable cells in said casing, a flexible strip having a duct formed therein, screw-threaded members embedded in said strip each having a bore for establishing communication between said duct and said cells, and a combined washer and nut for co-acting with said screw-threaded member for clamping a portion of said cells to said strip, the said nut being rotatable relatively to said washer.

In witness whereof I hereunto subscribe my name this 20th day of July, 1918.

HARRY L. von TROTT.

Witnesses:
R. H. WARDLE,
EDNA F. HEISING.

Copies of this patent may be obtained for five cents each, by addressing the "Commissioner of Patents, Washington, D. C."